United States Patent
Sugimoto

(10) Patent No.: US 12,341,866 B2
(45) Date of Patent: Jun. 24, 2025

(54) COMMUNICATION APPARATUS AND CONTROL METHOD THEREOF, AND STORAGE MEDIUM

(71) Applicant: CANON KABUSHIKI KAISHA, Tokyo (JP)

(72) Inventor: Shun Sugimoto, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 494 days.

(21) Appl. No.: 17/872,088

(22) Filed: Jul. 25, 2022

(65) Prior Publication Data
US 2023/0062831 A1 Mar. 2, 2023

(30) Foreign Application Priority Data
Aug. 25, 2021 (JP) ................... 2021-137368

(51) Int. Cl.
*H04L 69/22* (2022.01)
*G06F 9/44* (2018.01)
*G06F 9/4401* (2018.01)
*H04L 69/166* (2022.01)

(52) U.S. Cl.
CPC ............... *H04L 69/22* (2013.01); *G06F 9/44* (2013.01); *G06F 9/4403* (2013.01); *H04L 69/166* (2013.01)

(58) Field of Classification Search
CPC ..... H04L 69/22; H04L 69/166; G06F 9/4403; G06F 9/44
See application file for complete search history.

(56) References Cited

U.S. PATENT DOCUMENTS

| | | | | |
|---|---|---|---|---|
| 8,189,599 | B2* | 5/2012 | Sharma | H04L 69/12 370/413 |
| 8,886,822 | B2* | 11/2014 | Pedersen | H04L 67/34 709/219 |
| 2005/0135295 | A1* | 6/2005 | Walton | H04W 74/0808 370/328 |
| 2010/0023941 | A1* | 1/2010 | Iwamatsu | G06F 9/45558 718/1 |

(Continued)

FOREIGN PATENT DOCUMENTS

JP 2018-196053 A 12/2018

*Primary Examiner* — Raj Jain
(74) *Attorney, Agent, or Firm* — Carter, DeLuca & Farrell LLP

(57) ABSTRACT

A communication apparatus includes a processing unit that executes communication protocol processing by an OS kernel in place of the OS kernel. When the communication protocol processing by the OS kernel is hooked, a determination unit determines a state of a neighborhood entry holding cache information on a MAC header to be added to transmission data. A control unit controls a header generation processing based on the determined state of the neighborhood entry. The control unit, if the neighborhood entry holds valid cache information, performs control such that a processing unit generates a header of a layer higher than a MAC layer and the MAC header and, if the neighborhood entry does not hold valid cache information, performs control such that the processing unit generates the header of the higher layer and the OS kernel generates the MAC header.

11 Claims, 8 Drawing Sheets

(56) References Cited

U.S. PATENT DOCUMENTS

| | | | |
|---|---|---|---|
| 2013/0013906 A1* | 1/2013 | Brown | G06F 9/4403 713/2 |
| 2015/0326347 A1* | 11/2015 | Yu | H04L 1/0079 714/755 |
| 2023/0062831 A1* | 3/2023 | Sugimoto | H04L 69/166 |

* cited by examiner

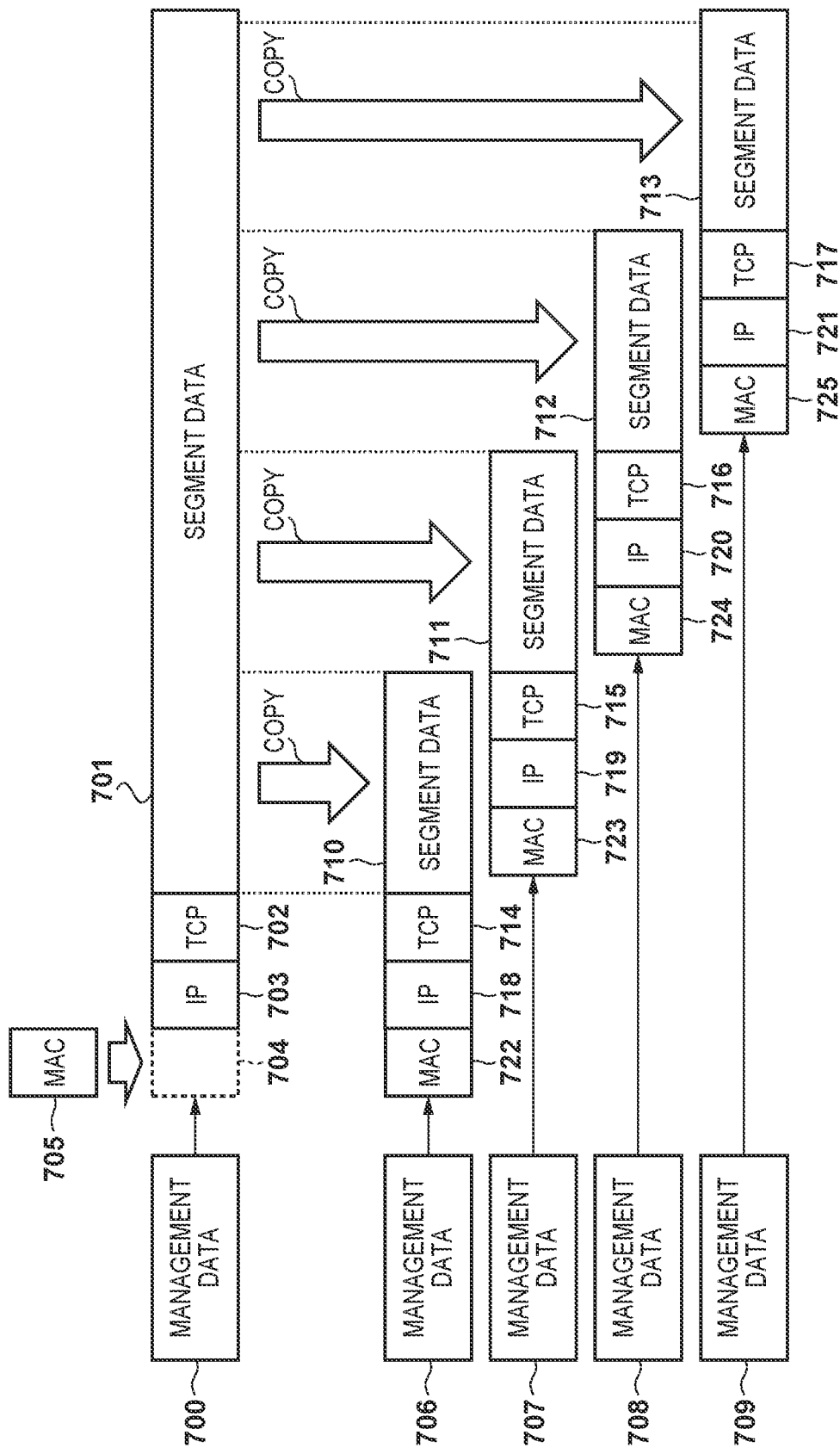

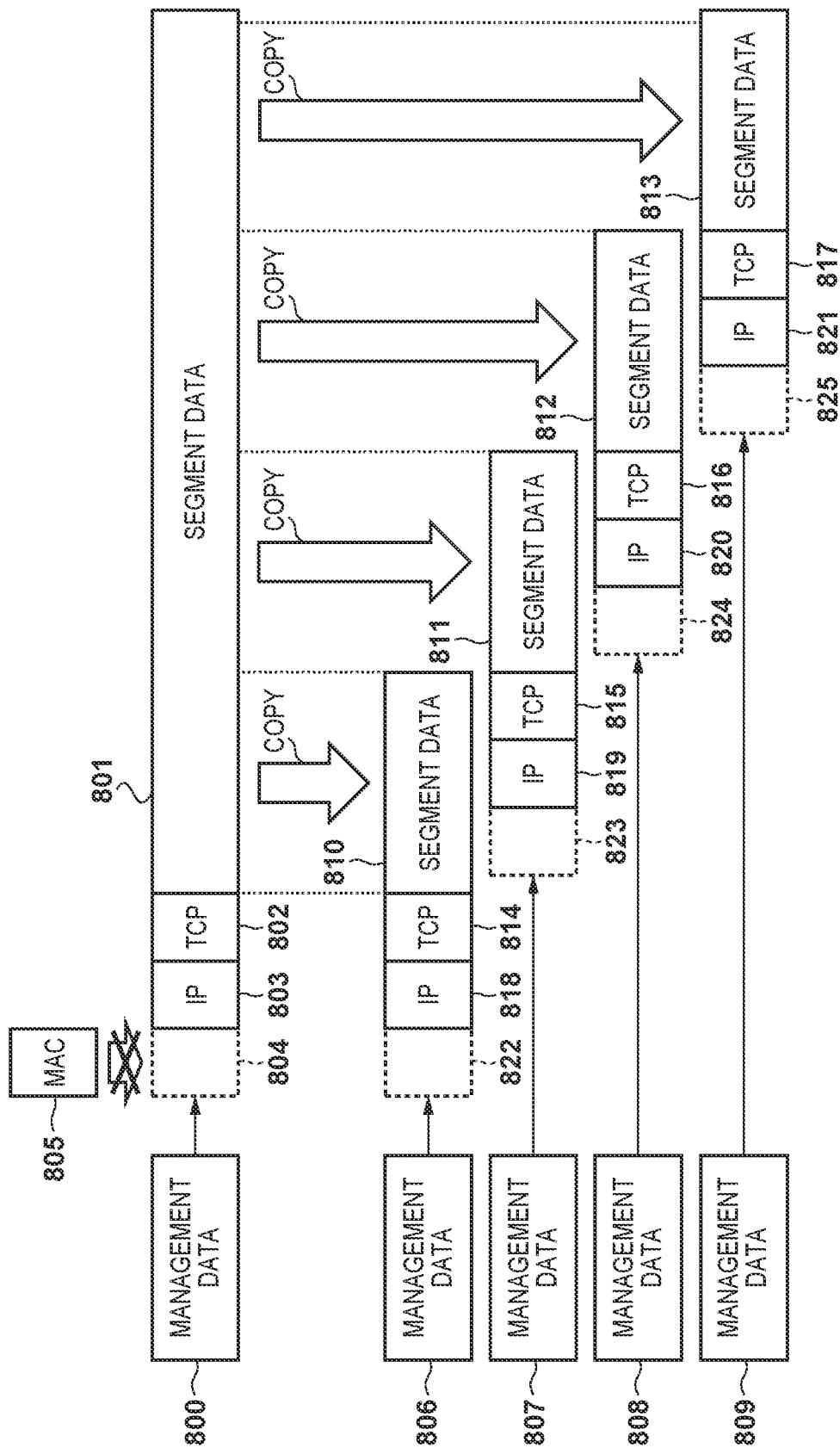

COMMUNICATION APPARATUS AND CONTROL METHOD THEREOF, AND STORAGE MEDIUM

BACKGROUND OF THE INVENTION

Field of the Invention

The present invention relates to a communication apparatus for performing data communication and a control method thereof, and a storage medium.

Description of the Related Art

In a communication apparatus, user data to be transmitted (transmission data) stored in a buffer is packetized in processing according to a communication protocol, such as TCP/IP. For example, the transmission data is divided into divided data (segment data) in maximum segment size (MSS) units in TCP. Then, a checksum of the divided data and a pseudo header is calculated, and an IP packet including the divided data and to which a TCP header and an IP header have been added is generated. Further, by adding a MAC header to the generated IP packet, a MAC frame, such as an Ethernet® frame, is generated, and the generated MAC frame is transmitted to a communication channel.

In recent years, there have been cases where an offload technology, in which the above-described division into segment data and generation of respective communication protocol headers are performed using hardware, such as a network interface (I/F), has been used for reduction of the processing load of a CPU and high-speed transmission. For example, as described in Japanese Patent Laid-Open No. 2018-196053, TCP segmentation offload (TSO) in which a network I/F performs part or all of TCP segmentation processing in place of a CPU is known. Further, the above document describes a technique for performing division into segment data and generation of TCP/IP/Ethernet headers using hardware different from a CPU regardless of whether or not a communication device includes a TSO function.

In the above-described conventional technique, realization of packetization (framing) of transmission data by offload processing may be accompanied by a change to a protocol stack of an OS kernel (for example, a change to the source code of an OS). This is undesirable in terms of OS serviceability and quality, particularly in an open-source software (OSS) OS kernel, such as Linux®. In addition, when cache information on a MAC header (correspondence information between a destination IP address and a destination MAC address) cannot be used, the MAC header cannot be generated by offload processing that uses hardware, and it may not be possible to generate a transmission packet (transmission frame).

SUMMARY OF THE INVENTION

Therefore, the present invention provides a technique for implementing part of communication protocol processing for generating a transmission packet by offload processing without making changes to an OS kernel and regardless of whether or not cache information on a MAC header can be used.

According to one aspect of the present invention, there is provided a communication apparatus, comprising: a processing unit configured to execute communication protocol processing by an OS kernel operating in the communication apparatus in place of the OS kernel, the processing unit performing division processing in which transmission data to be transmitted is divided into segment data and header generation processing in which a header is generated for and added to each segment data divided in the division processing; a hook unit configured to hook the communication protocol processing by the OS kernel; a determination unit configured to, when the communication protocol processing is hooked by the hook unit, determine a state of a neighborhood entry holding cache information on a MAC header to be added to the transmission data; and a control unit configured to control the header generation processing based on the state of the neighborhood entry determined by the determination unit, wherein the control unit, in a case where the neighborhood entry holds valid cache information, performs control such that the processing unit generates a header of a layer higher than a MAC layer and the MAC header and, in a case where the neighborhood entry does not hold valid cache information, performs control such that the processing unit generates the header of the higher layer and the OS kernel generates the MAC header.

According to another aspect of the present invention, there is provided a control method for a communication apparatus that comprises a processing unit configured to execute communication protocol processing by an OS kernel operating in the communication apparatus in place of the OS kernel, the processing unit performing division processing in which transmission data to be transmitted is divided into segment data and header generation processing in which a header is generated for and added to each segment data divided in the division processing, the control method comprising: hooking the communication protocol processing by the OS kernel; when the communication protocol processing is hooked in the hooking, determining a state of a neighborhood entry holding cache information on a MAC header to be added to the transmission data; and controlling the header generation processing based on the state of the neighborhood entry determined in the determining, wherein the controlling comprises performing, in a case where the neighborhood entry holds valid cache information, control such that the processing unit generates a header of a layer higher than a MAC layer and the MAC header and performing, in a case where the neighborhood entry does not hold valid cache information, control such that the processing unit generates the header of the higher layer and the OS kernel generates the MAC header.

According to still another aspect of the present invention, there is provided a non-transitory computer-readable storage medium storing a computer program for causing a computer to execute a control method for a communication apparatus that comprises a processing unit configured to execute communication protocol processing by an OS kernel operating in the communication apparatus in place of the OS kernel, the processing unit performing division processing in which transmission data to be transmitted is divided into segment data and header generation processing in which a header is generated for and added to each segment data divided in the division processing, the control method comprising: hooking the communication protocol processing by the OS kernel; when the communication protocol processing is hooked in the hooking, determining a state of a neighborhood entry holding cache information on a MAC header to be added to the transmission data; and controlling the header generation processing based on the state of the neighborhood entry determined in the determining, wherein the controlling comprises performing, in a case where the neighborhood entry holds valid cache information, control such that the processing unit generates a header of a layer higher than a MAC layer and the MAC header and performing, in a case where the neighborhood entry does not hold valid cache information, control such that the processing unit generates the header of the higher layer and the OS kernel generates the MAC header.

Further features of the present invention will become apparent from the following description of exemplary embodiments (with reference to the attached drawings).

BRIEF DESCRIPTION OF THE DRAWINGS

FIG. 7 illustrates an example of segment division and header generation for when cache information on a MAC header is valid.

FIG. 8 illustrates an example of segment division and header generation for when cache information on a MAC header is invalid.

DESCRIPTION OF THE EMBODIMENTS

Figure 1:
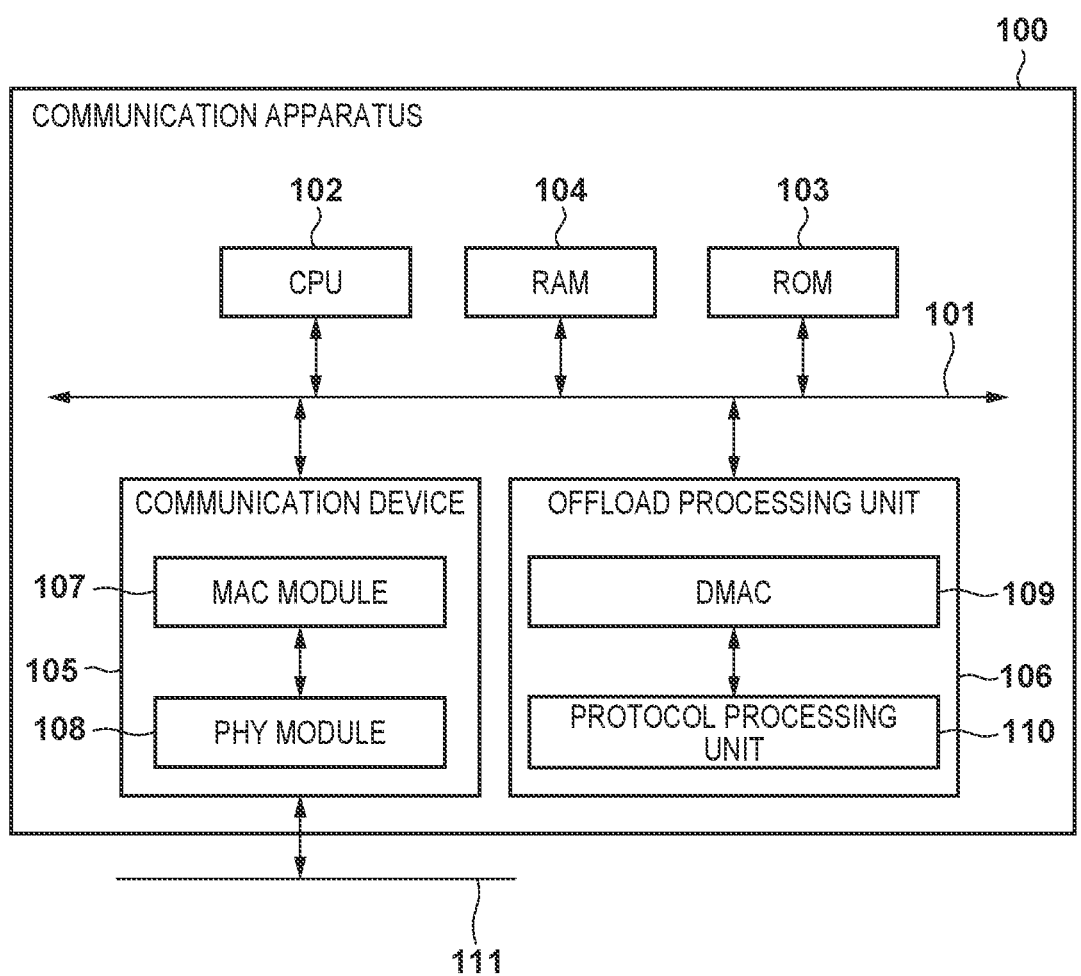
FIG. 1 is a block diagram illustrating an example of a hardware configuration of a communication apparatus.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

<Hardware Configuration of Communication Apparatus>

FIG. 1 is a block diagram illustrating an example of a hardware configuration of a communication apparatus 100 according to an embodiment of the present invention. The communication apparatus 100 is an apparatus including a communication function and may be, for example, a camera, a printer, a smartphone, a tablet, a personal computer (PC), a projector, and the like.

The communication apparatus 100 includes a CPU 102, a ROM 103, a RAM 104, a communication device 105, and an offload processing unit (offload processing hardware) 106. A system bus 101 connects the CPU 102, the ROM 103, the RAM 104, the communication device 105, and the offload processing unit 106 with each other and serves as a transfer path for various types of data between the connected devices.

The CPU 102 controls the communication apparatus 100 by comprehensively controlling the hardware devices 103 to 106 via an OS or a device driver. The ROM 103 stores control programs, such as an OS and a device driver, to be executed by the CPU 102. The RAM 104 functions as a main memory, a work area, and the like of the CPU 102 and can temporarily store programs and data.

The communication device 105 includes a media access control (MAC) module 107 and a physical layer (PRY) module 108 for communicating with a communication partner apparatus via a network 111. The network 111 is, fir example, a network for communication (wired LAN communication) conforming to an Ethernet® standard. The transmission and reception of data via the network 111 is performed by the CPU 102 executing a network driver and controlling the MAC module 107 according to the network driver.

The communication device 105 may include a function of performing communication (wireless LAN communication) confirming to a wireless LAN (Wi-Fi®) standard in place of or in addition to wired LAN communication. The communication device 105 may be configured to be capable of performing IP communication conforming to an arbitrary wired or wireless communication standard.

The offload processing unit 106 is a hardware unit including a direct memory access controller (DMAC) 109 and a protocol processing unit (protocol processing hardware) 110. The offload processing unit 106 executes processing (e.g., segment division processing and header generation processing) offloaded from the CPU 102. The offload processing unit 106 executes communication protocol processing by an OS kernel (an OS kernel 201 in FIG. 2) operating in the communication apparatus 100, in place of the OS kernel. That is, the offload processing unit 106 executes processing offloaded from the CPU 102. Specifically, the offload processing unit 106 performs division processing for dividing transmission data to be transmitted into segment data and header generation processing for generating and adding a header to each segment data divided by the division processing, as will be described later.

The DMAC 109 transfers data stored in the RAM 104 to the protocol processing unit 110 and transfers data processed by the protocol processing unit 110 to the RAM 104. The data transfer by the DMAC 109 is controlled by the CPU 102. Although only one DMAC 109 is illustrated in FIG. 1, a plurality of DMACs 109 may be provided in the offload processing unit 106. The plurality of DMACs may include, for example a DMAC for reading data from the RAM 104, a DMAC for writing data to the RAM 104, and the like.

The protocol processing unit 110 is hardware including a function of executing processing (communication protocol processing) according to a communication protocol such as transmission control protocol/internet protocol (TCP/IP). The protocol processing unit 110 may perform, for example, TCP or UDP checksum calculation, header generation processing, and the like.

The configuration example illustrated in FIG. 1 is only an example, and the communication apparatus 100 may include components not illustrated in FIG. 1. For example, the communication apparatus 100 may include a timer management unit. The timer management unit may manage whether a predetermined time has elapsed. The communication apparatus 100 may include a plurality of CPUs, or the CPU 102 may be configured by one or more processors. If the communication apparatus 100 is a camera, it may include an image capturing unit and a display unit.

<Functional Configuration of Communication Apparatus>

Figure 2:
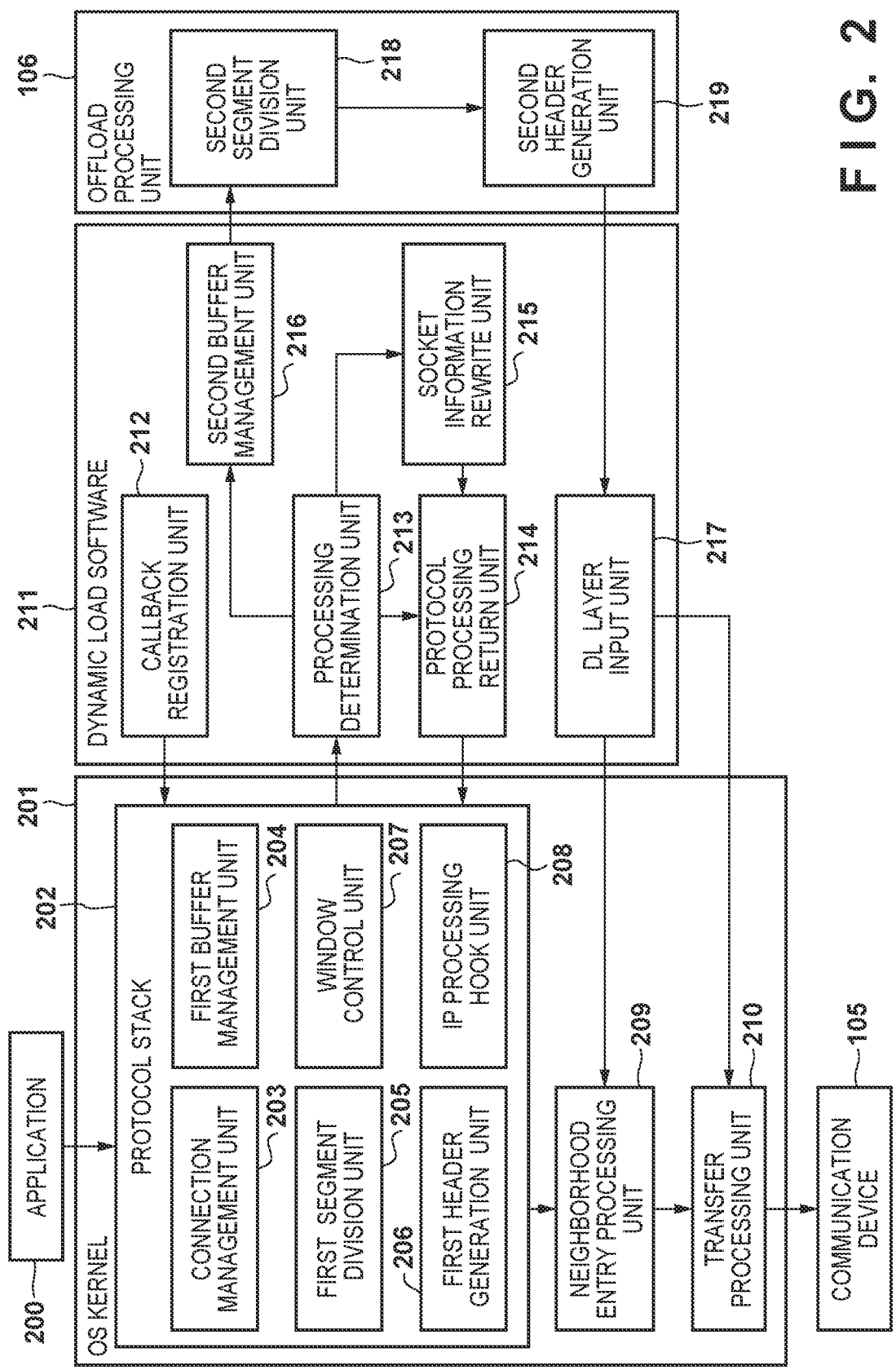
FIG. 2 is a block diagram illustrating an example of a functional configuration of the communication apparatus.

FIG. 2 is a block diagram illustrating an example of a functional configuration of the communication apparatus 100 in the present embodiment. The communication apparatus 100 includes, as functional components related to the present embodiment, an application 200, the OS kernel 201, dynamic load software 211, and a second segment division unit 218 and a second header generation unit 219 provided in the offload processing unit 106. In the present embodiment, Linux is assumed as the OS kernel 201 to be executed by the CPU 102; however, the present invention is not limited to Linux, and an OS kernel other than Linux may be used.

(Application 200)

The application 200 is a user application existing in user space. In the present embodiment, the application 200 is an application that performs TCP/IPv4 communication; however, it may be an application that performs UDP communication. Application data to be transmitted (transmission data) of an arbitrary size is inputted from the application 200 to the OS kernel 201 (protocol stack 202).

(OS Kernel 201)

The OS kernel 201 includes the protocol stack 202, a neighborhood entry processing unit 209, and a transfer processing unit 210. The protocol stack 202 includes a connection management unit 203, a first buffer management unit 204, a first segment division unit 205, a first header generation unit 206, a window control unit 207, and an IP processing hook unit 208.

The connection management unit 203 manages a communication connection of the communication apparatus 100. For example, the connection management unit 203 manages socket information, such as a maximum segment size (MSS) and offload selling information of the communication connection for the application 200, neighborhood entries held as entries in an address resolution protocol (ARP) table, and the like. The neighborhood entries include correspondence information indicating correspondence between a MAC address and an IP address (cache information on a MAC header added to segment data obtained by segment division). As described above, a neighborhood entry holds cache information on a MAC header to be added to transmission data.

The first buffer management unit 204 generates management data for managing a transmission buffer used in kernel space. The transmission buffer is allocated in a storage region of the RAM 104 and is managed using the management data generated by the first buffer management unit 204. The first buffer management unit 204 generates, as management data of a transmission buffer, a structure defined by, for example, a struct sk_buff when the OS kernel is Linux. The management data includes references to kernel space data addresses and socket information, references to communication apparatus information, and the like.

The first segment division unit 205 divides transmission data generated by the application 200 in MSS units and stores (copies) the obtained segment data in a kernel space transmission buffer. A data size of segment data stored in the transmission buffer is determined based on a TCP transmission window size, a congestion window size, and the like managed by the window control unit 207. In addition, when setting for offloading checksum calculation has not been performed in a TCP session, the first segment division unit 205 calculates a checksum value for segment data at the time of storing that segment data in the transmission buffer.

The first header generation unit 206 performs TCP or UDP transport layer processing and IP network layer processing (more specifically, processing for generating respective protocol headers). The window control unit 207 manages a TCP transmission window size and a congestion window. The IP processing hook unit 208 includes a function of registering a callback for hooking IP protocol processing as communication protocol processing (IP protocol processing) while the first header generation unit 206 is performing header generation processing for an IP header. For example, in Linux, processing by the IP processing hook unit 208 is realized using an application programming interface (API) provided in a framework called Netfilter.

The neighborhood entry processing unit 209 acquires cache information on a MAC header by referring to a neighborhood entry corresponding to a destination IP address included in an IP header indicated by management data. The neighborhood entry processing unit 209 generates a MAC header including a MAC address to be added to segment data using the acquired cache information. Neighborhood entries are managed using, for example, a struct neighbour structure in Linux. The neighborhood entry processing unit 209 acquires address information (a MAC address corresponding to an IP address) by performing address resolution processing when there is no neighborhood entry corresponding to a destination IP address or when a neighborhood entry exists but is not valid. This address resolution processing is address resolution protocol (ARP) processing for IPv4 communication and neighbor discovery processing for IPv6 communication. As described above, the neighborhood entry processing unit 209 of the present embodiment functions as an example of a generation unit that acquires a MAC address corresponding to a transmission destination IP address of transmission data by address resolution processing and generates a MAC header including the acquired MAC address.

In the present embodiment, a valid state in which a neighborhood entry is valid refers to a state in which address resolution is successful, a state in which address information is within a valid period after successful address resolution, and a state in which address information is statically set (a state in which address resolution is unnecessary). Meanwhile, an invalid state in which a neighborhood entry is invalid refers to a state other than the above (e.g., an address unresolved state, a state in which address information is expired, and a state during address resolution). When a neighborhood entry is in a valid state, a neighborhood entry holds valid cache information on a MAC header (a MAC address). In this case, the neighborhood entry processing unit 209 generates a MAC header based on the cache information and stores the generated MAC header in a transmission buffer managed by management data. Thereafter, the management data of the transmission buffer (i.e., transmission data stored in the transmission buffer and provided with TCP/IP/MAC headers) is sent from the neighborhood entry processing unit 209 to the transfer processing unit 210.

The transfer processing unit 210 includes a function of transferring inputted management data (i.e., transmission data stored in the transmission buffer and provided with TCP/IP/MAC headers) to the communication device 105. The transfer processing unit 210 also includes a driver of the communication device 105. The driver of the communication device 105 may be included in the OS kernel 201 or may be implemented as the dynamic load software 211. The transfer processing unit 210 of the present embodiment functions as an example of a transfer unit that transfers to the communication device 105 MAC frames obtained by adding a MAC header to each segment data obtained by dividing transmission data..

(Dynamic Load Software 211)

The dynamic load software 211 is software that is dynamically loaded after startup of the OS kernel 201 and operates independently of the OS kernel 201. The dynamic load software 211 includes a callback registration unit 212, a processing determination unit 213, a protocol processing return unit 214, a socket information rewrite unit 215, a second buffer management unit 216, and a data link (DL)

layer input unit 217. A procedure for processing to be performed by the dynamic load software 211 will be described later with reference to a flowchart of FIG. 3.

The callback registration unit 212 registers a callback that hooks IP protocol processing (communication protocol processing) by the OS kernel 201 using a function provided by the IP processing hook unit 208. That is, in the present embodiment, the callback registration unit 212 includes a function for hooking IP protocol processing. The callback registration unit 212 registers a callback when the dynamic load software 211 is loaded.

The processing determination unit 213 analyzes contents of management data for which an IP header has been generated in a callback registered by the callback registration unit 212 and performs determination for processing regarding that management data (determination of a method for processing management data). The processing determination unit 213 may perform, for example, the following determination (decision).

Determination to return management data to processing of the protocol stack 202 which is a hook source of IP protocol processing.

Determination to rewrite socket information of management data.

Determination to perform offload processing for management data.

Details of processing determination by the processing determination unit 213 will be described later with reference to the flowchart of FIG. 4.

When the processing determination unit 213 determines that management data is to be returned to processing of the protocol stack 202, the protocol processing return unit 214 returns the management data to the protocol stack 202. Alternatively, the protocol processing return unit 214 returns to the protocol stack 202 the management data for which socket information has been rewritten by the socket information rewrite unit 215.

When the processing determination unit 213 determines to rewrite the socket information of the management data, the socket information rewrite unit 215 rewrites the socket information of the management data. The socket information to be rewritten is, for example, an offload setting for offloading (hardware offloading) calculation of an MSS cache value and a checksum.

By setting an MSS cache value in socket information to a value larger than an actual MSS value, it becomes possible to increase a segment data size after division by the first segment division unit 205. This increases the size of segment data managed by one management data. It is also possible to increase the segment data size by setting segment offloading to be performed. When setting segment offloading to be performed, a maximum segment size and the maximum number of segments are also set. Further, by setting checksum calculation to be offloaded, it becomes possible to eliminate the need for checksum calculation by the first segment division unit 205, reducing the processing load in the protocol stack 202.

The management data for which the socket information has been rewritten is returned to the protocol stack 202 by the protocol processing return unit 214. Regarding a communication connection for which socket information has been rewritten, thereafter, management data for which checksum calculation has not been performed for large segment data, for example, is processed by the dynamic load software 211.

When the processing determination unit 213 determines to perform offload processing on management data (first management data), the second buffer management unit 216 allocates (generates) new management data for managing another transmission buffer (second management data). Processing to be a target of offload processing in the present embodiment is segment division processing and header generation processing. The number of management data to be allocated is calculated by dividing a segment data size managed by the original management data (the first management data) by an MSS of an actual TCP session. If there is a remainder after the division, the quotient is rounded up. For example, when a segment data size managed by the original management data is 15000 bytes and an MSS is 1460 bytes, 11 management data corresponding to 11 transmission buffers are allocated. A transmission buffer managed by management data is allocated in a storage region in the RAM 104.

The second buffer management unit 216 outputs the original management data (first management data) and the newly allocated management data (second management data) to the offload processing unit 106 for offload processing. The second management data is different from the first management data (original management data when the IP protocol processing is hooked from the OS kernel 201).

The DL layer input unit 217 receives management data corresponding to transmission data in which offload processing (segment division processing and header generation processing) has been performed by the offload processing unit 106 and transmits the management data to a DL layer of the OS kernel 201, which is a hook source of IP protocol processing. More specifically, when a neighborhood entry is valid, the DL layer input unit 217 transmits management data to the transfer processing unit 210, and when a neighborhood entry is invalid, the DL layer input unit 217 transmits management data to the neighborhood entry processing unit 209. A procedure for processing to be performed by the DL layer input unit 217 will be described later with reference to a flowchart of FIG. 6. The processing by the DL layer input unit 217 is performed in the callback processing described above.

(Offload Processing Unit 106)

The offload processing unit 106 includes, as functional components, the second segment division unit 218 and the second header generation unit 219, The second segment division unit 218 includes the DMAC 109. The second segment division unit 218 performs segment division processing using an address of segment data managed using the first management data as a read source of data and a segment data region managed using the second management data as a write destination of data.

The second header generation unit 219 generates a TCP header and an IP header to be added to transmission data indicated by the second management data and for which segment division processing has been performed. Here, transmission data indicated by the first management data includes header data indicating an IP header obtained by IP protocol processing. Therefore, based on that header data, the second header generation unit 219 performs header generation processing for the transmission data corresponding to the second management data. In addition, the second header generation unit 219 performs processing for generating a MAC header according to a state of a neighborhood entry (a valid state or an invalid state). A procedure for processing to be performed by the offload processing unit 106 (the second segment division unit 218 and the second header generation unit 219) will be described later with reference to a flowchart of FIG. 5.

In the present embodiment, the second segment division unit 218 and the second header generation unit 219 are realized by the offload processing unit 106; however, they may be implemented by software. Further, the configuration illustrated in FIG. 2 is an example, and a plurality of functional units illustrated in FIG. 2 may be integrated into one functional unit or any functional unit may be divided into a plurality of functional units. Further, some or all of the functional units included in the functional units illustrated in FIG. 2 may be realized by hardware, such as an application specific integrated circuit (ASIC).

<Processing Procedure for Dynamic Load Software>

Figure 3:
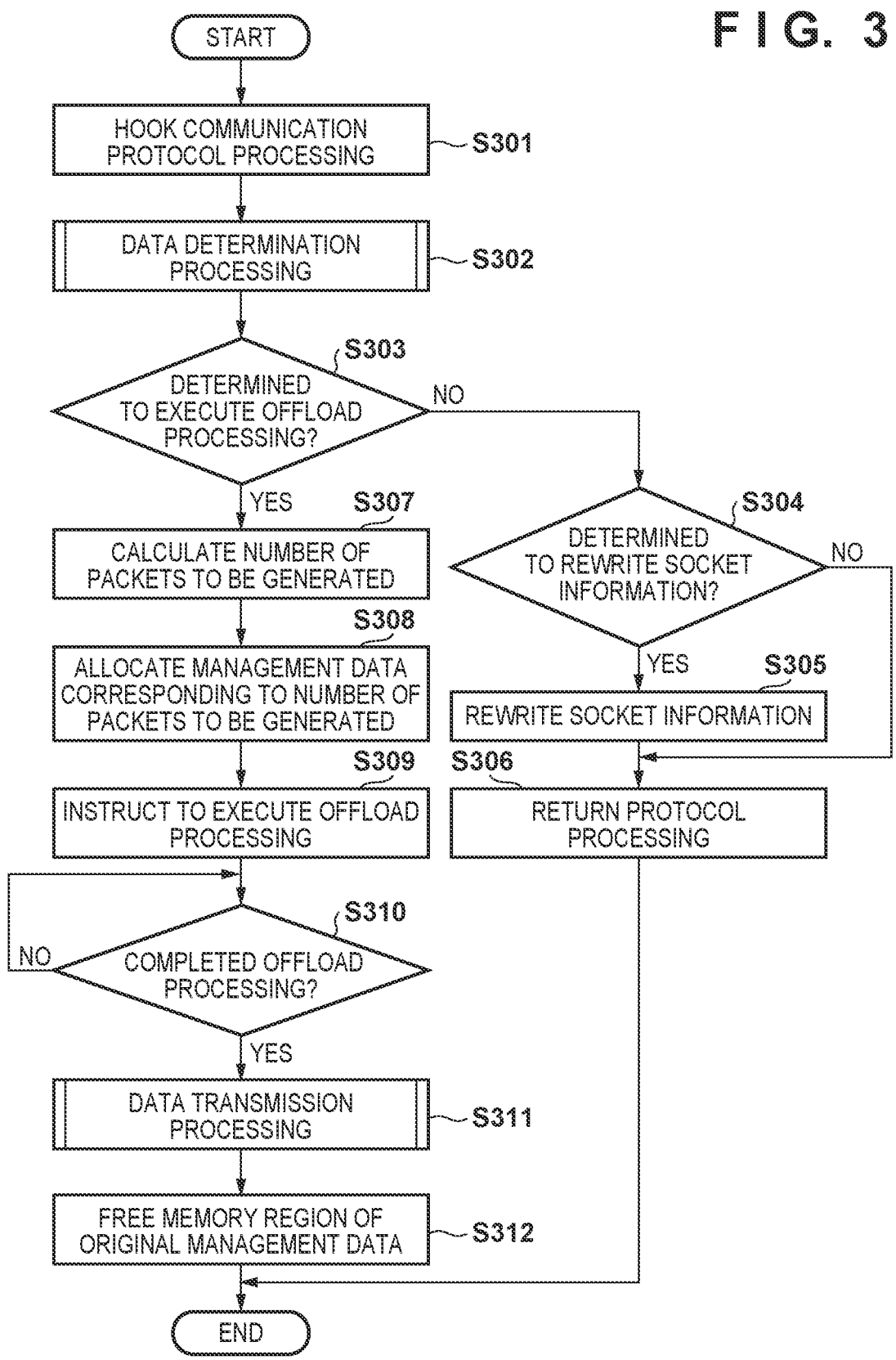
FIG. 3 is a flowchart for explaining a procedure for processing by dynamic load software.

FIG. 3 is a flowchart for explaining a procedure for processing performed by the dynamic load software 211 in the present embodiment. The dynamic load software 211 determines (decides) a method for processing the first management data related to communication protocol processing (IP protocol processing) hooked from the protocol stack 202 by the IP processing hook unit 208 and executes the processing based on the determination result. Processing of respective steps of FIG. 3 is realized, for example, by the CPU 102 reading and executing a program stored in the ROM 103.

In step S301, the dynamic load software 211 hooks communication protocol processing (IP protocol processing) performed by the OS kernel 201 from the protocol stack 202 by the processing determination unit 213 and starts registered callback processing by the callback registration unit 212. Next, in step S302, when the communication protocol processing is hooked, the dynamic load software 211 performs determination processing on the first management data related to the hooked communication protocol processing by the processing determination unit 213. The determination processing is executed in a procedure to be described later with reference to FIG. 4. As will be described later, the determination processing includes processing for determining a state of a neighborhood entry that holds cache information on a MAC header added to the transmission data.

In step S303, the dynamic load software 211 determines whether or not a result of a determination that offload processing (hardware offloading) is to be performed on the first management data is obtained by the determination processing of step S302. When a determination result that offload processing is not performed is obtained, the dynamic load software 211 advances the processing to step S304, and when a determination result that offload processing is to be performed is obtained, the dynamic load software 211 advances the processing to step S307.

In step S304, the dynamic load software 211 determines whether or not a determination result that socket information of the first management data is to be rewritten is obtained by the determination processing of step S302. When a determination result that socket information is to be rewritten is obtained, the dynamic load software 211 advances the processing to step S305, and when a determination result that socket information is not to be rewritten is obtained, the dynamic load software 211 advances the processing to step S306. In step S305, the dynamic load software 211 rewrites the socket information of the first management data by the socket information rewrite unit 215 as described above and advances the processing to step S306. In step S306, the dynamic load software 211 returns processing for the first management data to the protocol stack 202, which is a hook source, and ends the callback processing. The dynamic load software 211 returns—in a Netfilter framework, for example—a constant defined by NF_ACCEPT as a callback return value.

Meanwhile, in step S307, the dynamic load software 211 calculates by the above-described calculation the number of packets (the number of segments) to be generated in the segment division processing by the offload processing unit 106 (the second segment division unit 218) by the second buffer management unit 216. As described above, the dynamic load software 211 calculates the size of the transmission data and a predetermined size (in the present embodiment, an MSS in the TCP) and the number of segments indicating the number of segment data obtained from the transmission data in the segment division processing.

Next, in step S308, the dynamic load software 211 allocates the second management data corresponding to the number of packets to be generated calculated in step S307 by the second buffer management unit 216. That is, the second management data corresponding to the number of generated packets is allocated. For example, in Linux, the second management data is allocated by calling alloc_skb( ) a number of times equivalent to the number of packets to be generated (the number of segments). In this manner, the dynamic load software 211 generates management data (second management data) that manages transmission buffers, which is for storing segment data, of a number equivalent to the number of segments, separate from the transmission buffer for storing transmission data.

Further, in step S309, the dynamic load software 211 instructs the offload processing count 106 to execute offload processing. For example, a register of the offload processing unit 106 registered as a memory map I/O writes information necessary for offload processing and instructs the start of execution of the offload processing. The information necessary for offload processing includes, for example, address information on the first management data, address information on the second management data, and the like. In this way, the dynamic load software 211 sends (address information on) the first management data and (address information on) the second management data to the offload processing unit 106, Next, in step S310, the dynamic load software 211 determines whether or not offload processing by the offload processing unit 106 has been completed. This determination is performed based on, for example, a value read by reading a register value of the offload processing unit 106 indicating an execution state of processing by the offload processing unit 106. When the offload processing has not been completed, the dynamic load software 211 repeatedly (e.g., every time a predetermined time has elapsed) executes the determination processing of step S311 and when the offload processing has been completed, the dynamic load software 211 advances the processing to step S311.

In step S311, the dynamic load software 211 processing for transmitting the second management data corresponding to transmission data on which segment division processing and header generation processing have been performed by offload processing of the offload processing unit 106 to the OS kernel 201 as a hook source. This transmission processing is executed in a procedure to be described later with reference to FIG. 6. Finally, in step S312, the dynamic load software 211 frees the memory area of the first management data (original management data.) associated with the hooked communication protocol processing and terminates the callback processing. For example, in Linux, the dynamic load software 211 frees the memory area of the first management data by calling kfree_skb( ). In addition, the dynamic load software 211 returns—in a Netfilter framework, for example—a constant defined by NF_ACCEPT as a callback return value.

<Data Determination Processing>

Figure 4:
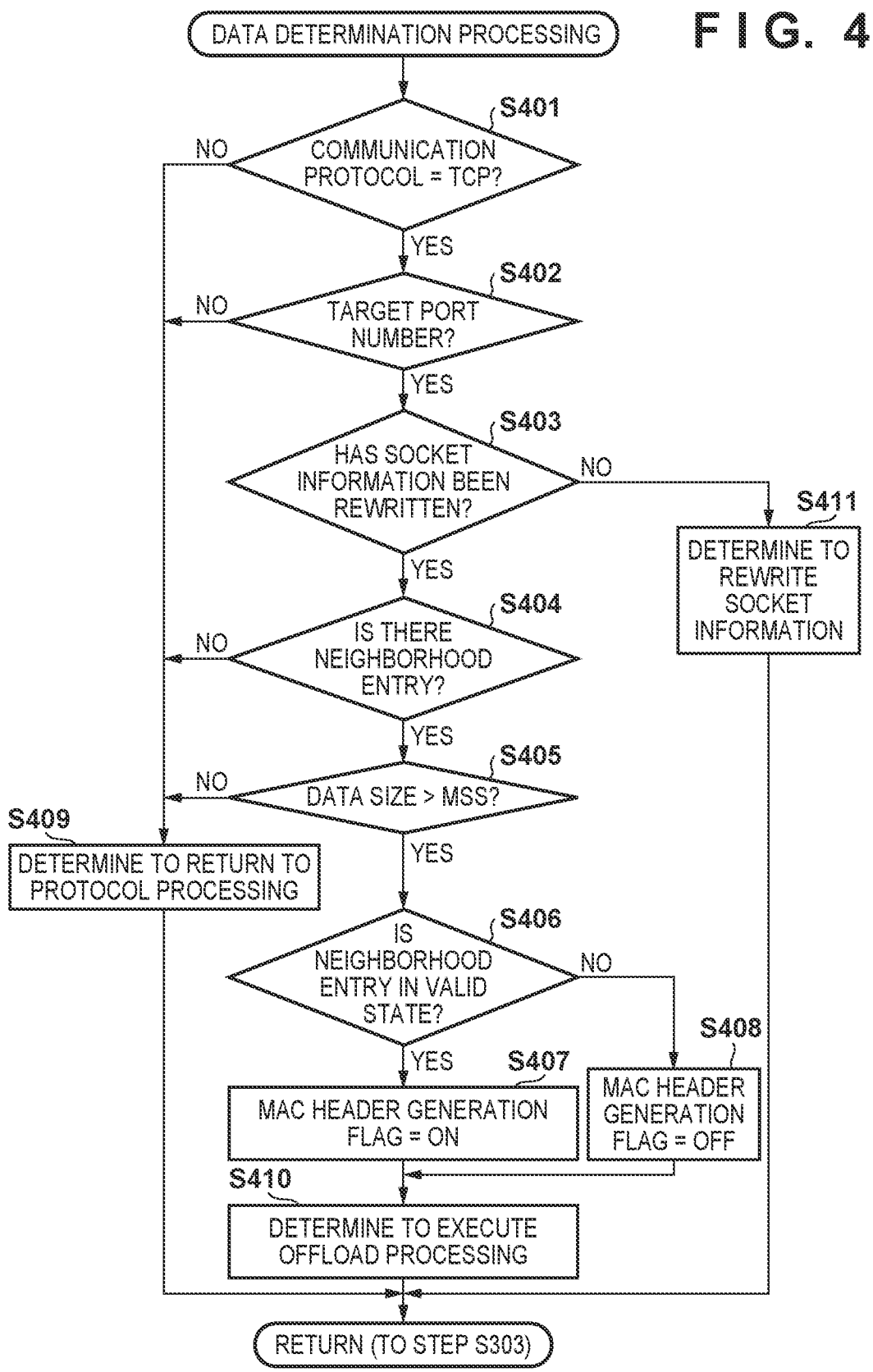
FIG. 4 is a flowchart for explaining a procedure for data determination processing (step S302).

FIG. 4 is a flowchart for explaining a procedure for data determination processing (step S302) in the present embodiment. In the data determination processing, the processing determination unit 213 analyzes the first management data related to the communication protocol processing hooked from the protocol stack 202 and determines the method for processing the data.

In step S401, the processing determination unit 213 confirms a transport layer communication protocol from an IP header indicated by the first management data and determines whether or not the communication protocol is a communication protocol that is an offload processing target. In the present embodiment, as an example, assume that TCP is an offload processing target. That is, the determination of step S401 is performed based on the type of communication protocol. If the transport layer communication protocol is TCP, the processing determination unit 213 advances the processing to step S402, and if it is not TCP, the processing determination unit 213 advances the processing to step S409.

In step S402, the processing determination unit 213 confirms a port number from the TCP header of the first management data and determines whether the port number is a port number that is an offload processing target. In the present embodiment, the port number (target port number) of the application to be the offload processing target is specified (inputted) in advance. If the port number is the target port number, the processing determination unit 213 advances the processing to step S403, and if the port number is not the target port number, the processing determination unit 213 advances the processing to step S409. The processing of step S402 (filtering by the port number) may be executed, for example, when it is desired to perform the offload processing only for a particular application and may be omitted in other cases.

In step S403, the processing determination unit 213 determines whether or not the socket information has been rewritten. Specifically, the processing determination unit 213 confirms the MSS cache value and the offload setting information in the socket information. If the socket information has been rewritten, the processing determination unit 213 advances the processing to step S404, and if the socket information has not been rewritten, the processing determination unit 213 advances the processing to step S411.

In step S404, the processing determination unit 213 determines whether or not there is a neighborhood entry (cache information on a MAC header) related to the segment data to be transmitted next. If there is no neighborhood entry, the processing determination unit 213 advances the processing to step S409, and if there is a neighborhood entry, the processing determination unit 213 advances the processing to step S405. In step S405, the processing determination unit 213 determines whether or not the segment data size of the first management data is larger than the MSS. If the segment data size is larger than the MSS, the processing determination unit 213 advances the processing to step S406, and if the segment data size is the MSS or less, the processing determination unit 213 advances the processing to step S409.

By this determination processing, the dynamic load software 211 (the processing determination unit 213) performs control for causing the offload processing unit 106 to execute the division processing for dividing the transmission data into segment data of a predetermined size when the size of the transmission data exceeds a predetermined size (in the present embodiment, the MSS in the TCP). When the size of the transmission data does not exceed the predetermined size, the dynamic load software 211 (the processing determination unit 213) controls the OS kernel 201 to execute the communication protocol processing by returning the hooked communication protocol processing to the OS kernel 201.

In step S406, the processing determination unit 213 determines whether or not the neighborhood entry is in a valid state. When the neighborhood entry is in a valid state (that is, when the neighborhood entry holds valid cache information), the processing determination unit 213 advances the processing to step S407. Meanwhile, when the neighborhood entry is not in a valid state (that is, when the neighborhood entry does not hold valid cache information), the processing determination unit 213 advances the processing to step S408. The state of the neighborhood entry is as described above with reference to FIG. 2. As described above, in steps S404 and S406, the processing determination unit 213 determines the state of the neighborhood entry that holds the cache information on a MAC header to be added to the transmission data.

In step S407, the processing determination unit 213 sets a MAC header generation flag held in the dynamic load software 211 to ON. Meanwhile, in step S408, the processing determination unit 213 sets the MAC header generation flag to OFF. The MAC header generation flag is a flag indicating whether or not to generate the MAC header by the second header generation unit 219 of the offload processing unit 106. When the flag is set to ON, the second header generation unit 219 generates a MAC header. When the flag is set to OFF, the second header generation unit 219 does not generate a MAC header. When the setting of the MAC header generation flag in step S407 or S408 is completed, the processing determination unit 213 advances the processing to step S410.

In step S409, the processing determination unit 213 determines that the first management data (the corresponding transmission data) is not an offload processing target and that the data is to be returned to the protocol processing of the protocol stack 202. In this case, the dynamic load software 211 sends the management data to the protocol processing return unit 214 in step S306 of FIG.

In step S410, the processing determination unit 213 determines that the offload processing is to be performed for the first management data (the first management data is an offload processing target). In this case, the dynamic load software 211 sends the management data to the second buffer management unit 216 in step S307 of FIG. 3.

In step S411, the processing determination unit 213 determines that the socket information of the first management data is to be rewritten. In this case, the dynamic load software 211 sends the management data to the socket information rewrite unit 215 in step S305 of FIG. 3.

<Processing Procedure for Offload Processing Unit 106>

The offload processing unit 106 executes communication protocol processing by the OS kernel 201 operating in the communication apparatus 100, in place of the OS kernel 201. Specifically, the offload processing unit 106 performs segment division processing for dividing transmission data to be transmitted into segment data and header generation processing for generating and adding a header to each segment data divided by the segment division processing. When a neighborhood entry holds valid cache information, the offload processing unit 106 is controlled by the dynamic load software 211 to generate headers (in this example, TCP/IP headers) of a layer higher than the MAC layer and the MAC header. Meanwhile, when a neighborhood entry holds valid cache information, the offload processing unit 106 is controlled by the dynamic load software 211 to generate headers (in this example, TCP/IP headers) of a layer higher than the MAC layer. In this case, the dynamic load software 211 controls the OS kernel 201 (the neighborhood entry processing unit 209) to generate the MAC header.

Figure 5:
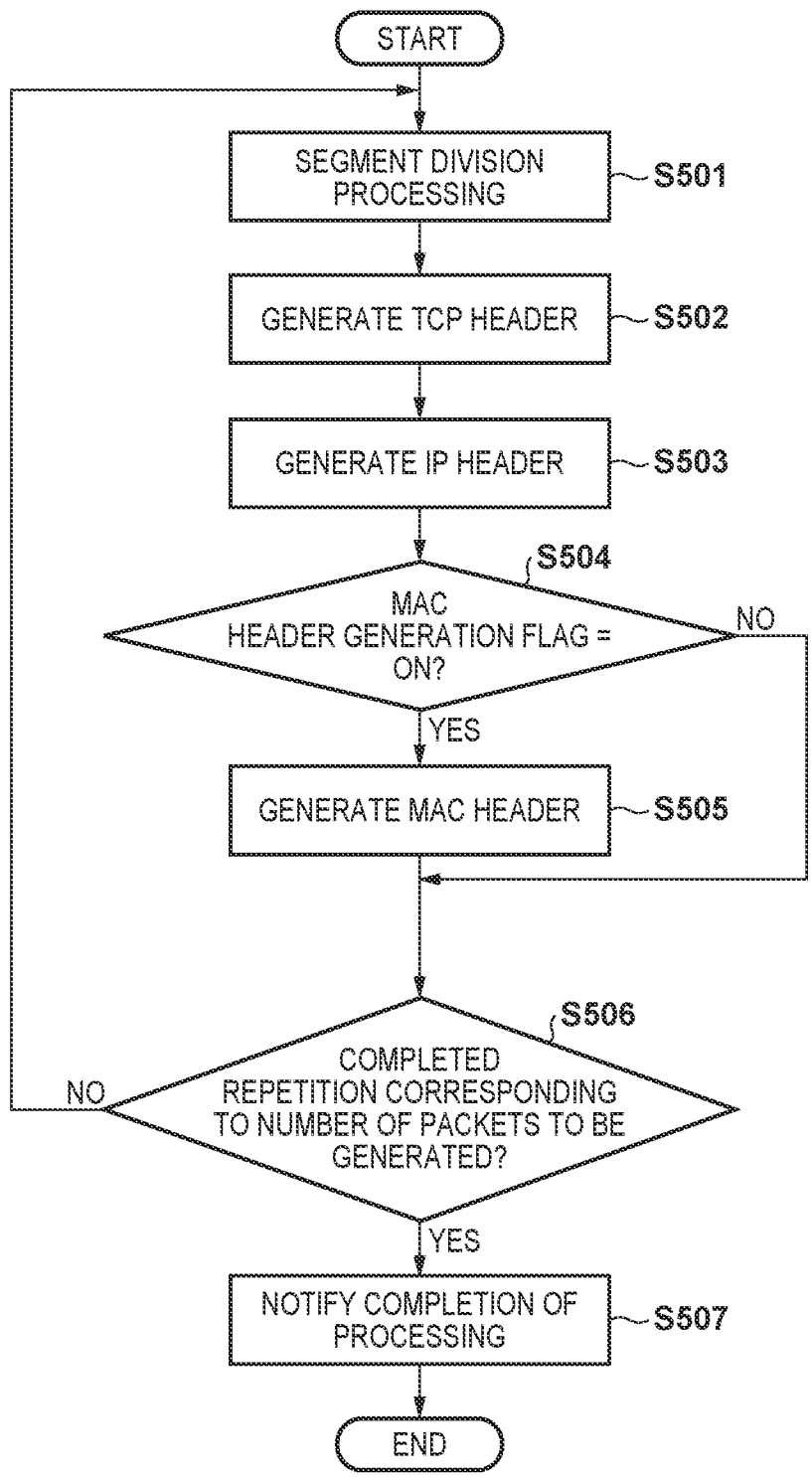
FIG. 5 is a flowchart for explaining a procedure for processing by an offload processing unit 106.

FIG. 5 is a flowchart for explaining a procedure for processing to be executed by an offload processing unit 106. The offload processing unit 106 executes the offload processing in accordance with an execution instruction (step S309) from the dynamic load software 211. The offload processing unit 106 divides the segment data stored in the transmission buffer corresponding to the first management data and stores the divided segment data in the transmission buffer corresponding to the second management data. The offload processing unit 106 further generates TCP/IP headers corresponding to the second management data (that is, to be added to the divided segment data) from TCP/IP headers corresponding to the first management data.

The offload processing unit 106 repeats the processing of steps S501 to S505 for the number of generated packets. First, in step S501, the offload processing unit 106 performs segment division processing by the second segment division unit 218. Specifically, the second segment division unit 218 acquires the segment data by the DMAC 109 using the address of the segment data managed by the first management data as the read source address. The second segment division unit 218 performs segment division processing by dividing the acquired segment data into segment data in MSS units. More specifically, the second segment division unit 218 performs segment division processing by performing a memory copy for the segment data in MSS units using the managed data area as the write destination for the second management data allocated by the second buffer management unit 216.

In step S502, the offload processing unit 106 generates the TCP header by the second header generation unit 219. The second header generation unit 219 acquires the TCP header corresponding to the first management data, uses the port number information, the control flag, and the like as is for the second management data, and performs calculation of a sequence number, a checksum, and the like.

In step S503, the offload processing unit 106 generates the IP header by the second header generation unit 219. The second header generation unit 219 acquires the IP header corresponding to the first management data, uses the address information, protocol information, and the like as is for the second management data, and performs calculation of values varying for each second management data (such as packet length, identifier, and checksum).

In step S504, the offload processing unit 106 determines whether or not the MAC header generation flag inputted from the dynamic load software 211 is set to ON. When the MAC header generation flag is set to ON, the offload processing unit 106 advances the processing to step S505, and when the MAC header generation flag is set to OFF, the offload processing unit 106 advances the processing to step S506 without generating the MAC header.

In step S505, the offload processing unit 106 generates the MAC header by the second header generation unit 219. The offload processing unit 106 generates the MAC header using the cache information on a MAC header included in the neighborhood entry, which is inputted from the dynamic load software 211. Specifically, the MAC header is generated by copying the destination MAC address, the source MAC address, and the like included in the cache information to the MAC header region corresponding to the second management data.

In this way, a packet (MAC frame) to which a TCP header, an IP header, and a MAC header are added to the segment data after division in step S501 is generated as transmission data. The generated packet (MAC frame) is stored in the transmission buffer managed by the second management data. Meanwhile, when the MAC header is not generated in step S505, the packet to which the TCP header and the IP header are added to the segment data after division in step S501 is generated as the transmission data. In this case, the MAC header is generated by the neighborhood entry processing unit 209 of the OS kernel 201 and is added to the transmission data to generate the MAC frame.

In step S506, the offload processing unit 106 determines whether or not the repetition corresponding to the number of generated packets is completed for the processing of steps S501 to S505, returns the processing to step S501 if not completed, and advances the processing to step S507 when the processing is completed.

In step S507, the offload processing unit 106 performs processing for notifying that the offload processing for packet generation is completed. This completion notification is can be realized in various ways. For example, a value indicating completion of processing may be written to a register indicating the state of the offload processing unit 106, or a hardware interrupt signal indicating completion of processing may be outputted to the CPU 102. Further, instead of a direct signal being outputted to the CPU 102, the completion notification may be performed separately via an interrupt controller. In addition, information indicating completion of processing may be written to a specific hit of the address region (the storage region of the RAM 104) inputted from the dynamic load software 211.

<Data Transmission Processing>

Figure 6:
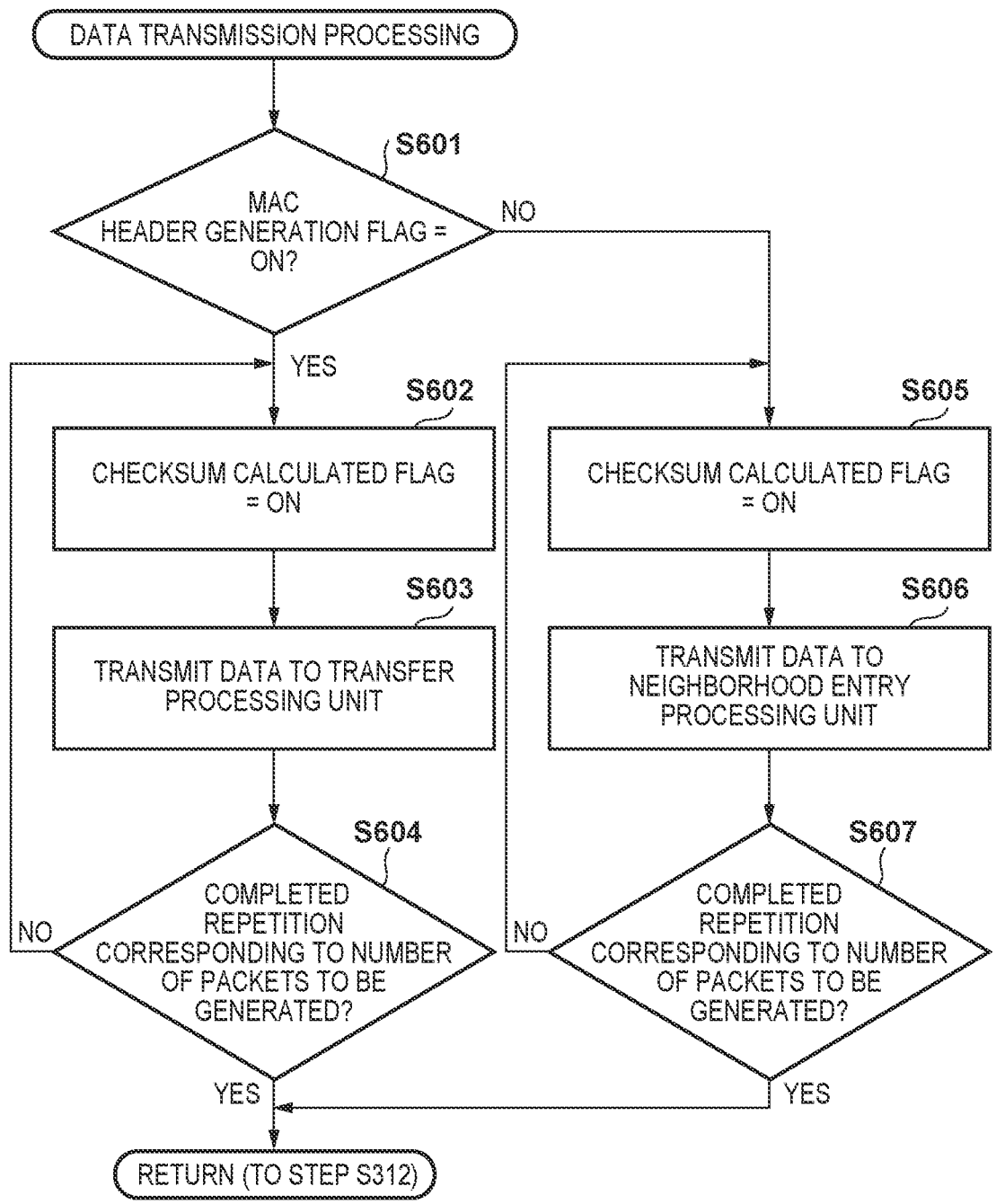
FIG. 6 is a flowchart for explaining a procedure for data transmission processing (step S311).

FIG. 6 is a flowchart for explaining a procedure for data transmission processing (step S311) for transmitting management data (second management data) to a hook source (OS kernel 201) in the present embodiment. When the MAC header generation flag is set to ON, the DL layer input unit 217 of the dynamic load software 211 transmits the second management data corresponding to a packet (transmission data) generated by the offload processing unit 106 to the transfer processing unit 210. When the MAC header generation flag is set to OFF, the DI, layer input unit 217 transmits the second management data corresponding to the packet (transmission data) generated by the offload processing unit 106 to the neighborhood entry processing unit 209.

In step S601, the DL layer input unit 217 determines whether or not the MAC header generation flag is set to ON. When the MAC header generation flag is set to ON, the DL layer input unit 217 advances the processing to step S602, and when the MAC header generation flag is set to OFF, the DL layer input unit 217 advances the processing to step S605. In the following, the DL layer input unit 217 repeats the processing of step S602 to S603 or steps S605 to S606 as many times as the number of packets generated by the offload processing unit 106 (the number of second management data).

In step S602, the DL layer input unit 217 sets a checksum calculated flag in the second management data to ON. This indicates that TCP/IP checksum value in the second management data has already been calculated. Next, in step S603, the DL layer input unit 217 inputs (transmits) the second management data to the transfer processing unit 210. The input of the second management data in step S603 is performed using the functions of the OS kernel 201. For example, in Linux, the input of the second management data to the transfer processing unit 210 may be realized by calling dev_queue_xmit( ). In this way, the DL layer input unit 217 sends the MAC frame obtained by adding the upper layer headers (TCP/IP headers) and the MAC header to each segment data generated by the offload processing unit 106 to the transfer processing unit 210.

Thereafter, in step S604, the DL layer input unit 217 determines whether or not the repetition corresponding to the number of packets generated by the offload processing unit 106 is completed for the processing of steps S602 to S603 and returns the processing to step S602 if not completed. Meanwhile, when the repetition is completed, the DL layer input unit 217 ends the processing according to the procedure of FIG. 6.

Meanwhile, in step S605, the DL layer input unit 217, similarly to step S602, sets the checksum calculated flag in the second management data to ON. Next, in step S606, the DL layer input unit 217 inputs (transmits) the second management data to the neighborhood entry processing unit 209. The input of the second management data in step S606 is performed using the functions of the OS kernel 201. For example, in Linux, the input of the second management data to the neighborhood entry processing unit 209 may be realized by calling neigh_resolve_output( ). In this way, the DL layer input unit 217 sends the packet obtained by adding the upper layer headers (TCP/IP headers) to each segment data generated by the offload processing unit 106 the neighborhood entry processing unit 209.

Thereafter, in step S607, the DL layer input unit 217 determines whether or not the repetition corresponding to the number of packets generated by the offload processing unit 106 is completed for the processing of steps S605 to S606 and returns the processing to step S605 if not completed. Meanwhile, when the repetition is completed, the DL layer input unit 217 ends the processing according to the procedure of FIG. 6.

<Example of Segment Division and Header Generation (when Neighborhood Entry is Valid)>

FIG. 7 is a diagram illustrating an example of segment division and header generation by the offload processing unit 106 when the cache information on a MAC header is valid (when the neighborhood entry is in a valid state). In the offload processing unit 106 of the present embodiment, the segment division processing is performed by the second segment division unit 218, and the header generation processing is performed by the second header generation unit 219. FIG. 7 illustrates an example of the status of the transmission buffer (allocated in the storage area of the RAM 104) managed by management data 700 to 709.

The management data 700 is an example of first management data when communication protocol processing is hooked from protocol stack 202. The transmission data (packet) stored in the transmission buffer corresponding to the management data 700 is configured by segment data 701, a TCP header 702, and an IP header 703. In the transmission buffer, a MAC header region 704 for storing a MAC header is allocated.

When the segment data 701 has a segment size larger than the MSS, it becomes a target of offload processing performed by the offload processing unit 106. The TCP header 702 and the IP header 703 are headers generated by the first header generation unit 206 for the segment data 701. In the present embodiment, assume a state in which a TCP/IP checksum value has not been calculated due to the hook processing being performed by the IP processing hook unit 208 while the first header generation unit 206 is performing the header generation processing.

The MAC header region 704 is a region for storing the MAC header added to the transmission data (packet). The MAC header is not added to the transmission data (transmission packet) corresponding to the management data 700. Cache information 705 is cache information on a MAC header held by the neighborhood entry. The dynamic load software 211 copies (performs a memory copy of) the cache information 705 held by the neighborhood entry to the MAC header region 704 and writes the memory address information about the cache information into the register of the offload processing unit 106. By this, the offload processing unit 106 can refer to the cache information 705.

The management data 706 to 709 are management data (second management data) generated (allocated) by the dynamic load software 211 (second buffer management unit 216). FIG. 7 illustrates an example in which the number of packets generated in the segment division processing is 4, and the four management data 706 to 709 are generated accordingly. Each of the management data 706 to 709 manages a transmission buffer for storing the divided segment data (transmission data).

In the offload processing unit 106, the second segment division unit 218 divides the segment data 701 into segment data 710 to 713 in MSS units. The segment data 710 to 713 are stored in a segment data region managed by the management data. 706 to 709.

The second header generation unit 219 generates TCP headers 714 to 717 based on the TCP header 702 indicated by the management data. 700 and adds the TCP headers 714 to 717 to the segment data 710 to 713, respectively. The second header generation unit 219 generates IP headers 718 to 721 based on the IP header 703 indicated by the management data 700 and adds the IP headers 718 to 721 before TCP headers 714 to 717, respectively. The second header generation unit 219 further generates MAC headers 722 to 725 by duplicating the MAC header included in the cache information 705 and adds the MAC headers 722 to 725 before the IP headers 718 to 721, respectively. As described above, the offload processing unit 106 (the second header generation unit 219) generates MAC headers to be added to respective segment data divided by the segment division processing based on the cache information 705 held by the neighborhood entry.

In this way, a packet (MAC frame) obtained by adding a TCP header, an IP header, and a MAC header to each segment data divided by the segment division processing is generated. Each generated packet is stored in a corresponding transmission buffer managed by the management data 806 to 809.

<Example of Segment Division and Header Generation (when Neighborhood Entry is Invalid)>

FIG. 8 is a diagram illustrating an example of segment division and header generation by the offload processing unit 106 when the cache information on a MAC header is invalid (when the neighborhood entry is in an invalid state). Here, a description will be given for points of difference from the case where the cache information on a MAC header illustrated in FIG. 7 is valid.

If cache information 805 on a MAC header held in the neighborhood entry is invalid, the second header generation unit 219 cannot generate a MAC header using the cache information 805. Therefore, the generation of a MAC header by the second header generation unit 219 and the addition of a MAC header to MAC header regions 822 to 825 are not performed. In this case, the MAC header is generated and added by the neighborhood entry processing unit 209 of the OS kernel 201.

<Summary>

As described above, in the communication apparatus 100 of the present embodiment, the dynamic load software 211 hooks communication protocol processing performed by the OS kernel 201. When the communication protocol processing is hooked, the dynamic load software 211 determines the state of a neighborhood entry that holds cache information on a MAC header to be added to transmission data. The dynamic load software 211 controls header generation processing based on the determined neighborhood entry state. The dynamic load software 211 controls the offload processing unit 106 to generate headers of a layer higher than a MAC layer and a MAC header if the neighborhood entry holds valid cache information. Meanwhile, if the neighborhood entry does not hold valid cache information, the dynamic load software 211 controls the offload processing unit 106 to generate upper layer headers and the OS kernel 201 to generate a MAC header.

For example, the dynamic load software 211 controls the offload processing unit 106 to generate a TCP header, an IP header, and a MAC header if the neighborhood entry holds valid cache information. Meanwhile, if the neighborhood entry does not hold valid cache information, the dynamic load software 211 controls the offload processing unit 106 to generate a TCP header and IP header and the OS kernel 201 to generate a MAC header.

In this manner, it becomes possible to realize part of the communication protocol processing for generating transmission packets by offload processing by the dynamic load software 211 independent of the OS kernel 201 (i.e., without making changes to the OS kernel 201). In addition, when the cache information on a MAC header can be used, the offload processing unit 106 performs the header generation processing, and when the cache information cannot be used, the OS kernel 201 performs the header generation processing, thereby making it possible to appropriately generate transmission packets. That is, regardless of whether or not the cache information on a MAC header can be used, part of the communication protocol processing for generating transmission packets can be realized by offload processing. The reduction of the processing load in the CPU 102 (protocol stack 202) associated with the communication protocol processing can be realized with a simple configuration.

Various modifications are possible for the above-described embodiment. For example, the port number used in step S402 of FIG. 4 is a destination/source port number. Further, a configuration may be taken so as to use a destination IP address in place of the port number, where if the destination IP address is the destination IP address that is an offload processing target, the process proceeds to step S403. Further, the processing determination unit 213 may determine that the socket information of the management data related to the hooked communication protocol processing is rewritten if a shift count of a TCP window scale (after a 3-way handshake) is equal to or larger than a predetermined value (e.g., 1). When checksum calculation is off at the execution completion of processing of step S409, the protocol processing return unit 214 may return the management data to the protocol stack 202 after performing checksum calculation. In this case, the protocol processing return unit 214 returns the management data to the IP layer.

Further, in the above-described embodiment, a description has been given for an example in which the completion of processing of the offload processing unit 106 is awaited during the callback processing performed by the dynamic load software 211, however, it is not necessary to wait during the callback processing. For example, in step S309 of FIG. 3, after instructing for the offload processing unit 106 to execute offload processing, the dynamic load software 211 skips the processing of steps S310 and S311 and advances the processing in step S312. Further, in step S507 of FIG. 5, the offload processing unit 106 notifies the CPU 102 of completion of processing by a hardware interrupt signal. The dynamic load software 211 registers a handler (Top Half) for the hardware interrupt signal in advance, schedules delay execution processing (Bottom Half) in the handler, and executes data transmission processing step S311) as the delay execution processing. The delay execution processing can be realized, for example, by a software interrupt. Tasklet, or the like in Linux. With this configuration, while the offload processing unit 106 is performing the offload processing, the CPU 102 can perform another process, thereby making it possible to increase parallel processing performance.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-137368, filed Aug. 25, 2021, which is hereby incorporated by reference herein in its entirety.

What is claimed is:
1. A communication apparatus, comprising:
  a processing circuit, implemented as a hardware circuit that executes communication protocol processing by an OS kernel operating in the communication apparatus in place of the OS kernel, the processing circuit perform- ing division processing in which transmission data to be transmitted is divided into segment data and header generation processing in which a header is generated for and added to each segment data divided in the division processing;

one or more processors; and one or more memories including instructions that, when executed by the one or more processors, cause the one or more processors to perform operations comprising:

hooking the communication protocol processing by the OS kernel;

when the communication protocol processing is hooked in the hooking, determining a state of a neighborhood entry holding cache information on a MAC header to be added to the transmission data; and controlling the header generation processing based on the state of the neighborhood entry determined in the determining, wherein the controlling comprises performing, in a case where the neighborhood entry holds valid cache information, control such that the processing circuit generates a header of a layer higher than a MAC layer and the MAC header and, in a case where the neighborhood entry does not hold valid cache information, control such that the processing circuit generates the header of the higher layer and the OS kernel generates the MAC header.

2. The communication apparatus according to claim 1, wherein the controlling comprises performing, in a case where the neighborhood entry holds valid cache information, control such that the processing circuit generates a TCP header, an IP header, and the MAC header and, in a case where the neighborhood entry does not hold valid cache information, control such that the processing circuit generates the TCP header and the IP header and the OS kernel generates the MAC header.

3. The communication apparatus according to claim 1, wherein the controlling further comprises, in a case where a size of the transmission data exceeds a predetermined size, causing the processing circuit to execute division processing in which the transmission data is divided into segment data of the predetermined size.

4. The communication apparatus according to claim 3, wherein the controlling further comprises, in a case where the size of the transmission data does not exceed the predetermined size, causing the OS kernel to execute the communication protocol processing by returning the communication protocol processing hooked in the hooking to the OS kernel.

5. The communication apparatus according to claim 3, wherein the controlling comprises calculating a number of segments indicating a number of segment data obtained from the transmission data in the division processing based on the size of the transmission data the predetermined size, generating management data that manages transmission buffers, which are for storing segment data, of a number equivalent to the number of segments, separately from a transmission buffer for storing the transmission data, and transmitting the management data to the processing circuit.

6. The communication apparatus according to claim 3, wherein the predetermined size is a maximum segment size in TCP.

7. The communication apparatus according to claim 1, further comprising:

a communication device that communicates with a communication partner apparatus via a network,
wherein the OS kernel performs operations comprises acquiring by address resolution processing a MAC address corresponding to a transmission destination IP address of the transmission data and generate a MAC header including the acquired MAC address, and transferring to the communication device a MAC frame obtained by adding the MAC header to each segment data obtained by dividing the transmission data, and wherein the controlling comprises in a case where the neighborhood entry holds valid cache information, transmitting to the OS kernel a MAC frame obtained by adding to each segment data the header of the higher layer and the MAC header generated by the processing circuit, and in a case where the neighborhood entry does not hold valid cache information, transmits to the OS kernel a packet obtained by adding to each segment data the header of the higher layer generated by the processing circuit.

8. The communication apparatus according to claim 1, wherein the processing circuit generates a MAC header to be added to each segment data divided by division processing based on the cache information held by the neighborhood entry.

9. The communication apparatus according to claim 1, wherein the neighborhood entry is managed by the OS kernel.

10. A control method for a communication apparatus that comprises: a processing circuit, implemented as a hardware circuit, that executes communication protocol processing by an OS kernel operating in the communication apparatus in place of the OS kernel, the processing circuit performing division processing in which transmission data to be transmitted is divided into segment data and header generation processing in which a header is generated for and added to each segment data divided in the division processing; and one or more processors, the control method comprising:

hooking, by the one or more processors, the communication protocol processing by the OS kernel;

when the communication protocol processing is hooked in the hooking, determining, by the one or more processors, a state of a neighborhood entry holding cache information on a MAC header to be added to the transmission data; and controlling, by the one or more processors, the header generation processing based on the state of the neighborhood entry determined in the determining, wherein the controlling comprises performing, in a case where the neighborhood entry holds valid cache information, control such that the processing circuit generates a header of a layer higher than a MAC layer and the MAC header and performing, in a case where the neighborhood entry does not hold valid cache information, control such that the processing circuit generates the header of the higher layer and the OS kernel generates the MAC header.

11. A non-transitory computer-readable storage medium storing a computer program for causing a computer to execute a control method for a communication apparatus that comprises a processing circuit, implemented as a hardware circuit, that executes communication protocol processing by an OS kernel operating in the communication apparatus in place of the OS kernel, the processing circuit performing division processing in which transmission data to be transmitted is divided into segment data and header generation processing in which a header is generated for and added to each segment data divided in the division processing; and one or more processors, the control method comprising:
- hooking, by the one or more processors, the communication protocol processing by the OS kernel;
- when the communication protocol processing is hooked in the hooking, determining, by the one or more processors, a state of a neighborhood entry holding cache information on a MAC header to be added to the transmission data; and
- controlling, by the one or more processors, the header generation processing based on the state of the neighborhood entry determined in the determining,
- wherein the controlling comprises performing, in a case where the neighborhood entry holds valid cache information, control such that the processing circuit generates a header of a layer higher than a MAC layer and the MAC header and performing, in a case where the neighborhood entry does not hold valid cache information, control such that the processing circuit generates the header of the higher layer and the OS kernel generates the MAC header.

* * * * *